March 29, 1932.   F. E. STAHL   1,851,460

TIRE CHAIN FASTENER

Filed July 30, 1930

Inventor
FRANK E. STAHL

By

His Attorneys

Patented Mar. 29, 1932

1,851,460

UNITED STATES PATENT OFFICE

FRANK E. STAHL, OF TONAWANDA, NEW YORK, ASSIGNOR TO THE COLUMBUS-McKINNON CHAIN CORPORATION, OF TONAWANDA, NEW YORK, A CORPORATION OF OHIO

TIRE CHAIN FASTENER

Application filed July 30, 1930. Serial No. 471,816.

This invention relates to anti-skid tire chain fasteners and has for its objects to provide an improved and simplified means whereby such a fastener can be produced at low cost, and be easily manipulated for application and removal by the user. Other objects will appear from the disclosure.

According to the invention an end link of a rim or side chain has pivoted to it a cam lever provided with a projection at its free end said cam lever being first hooked into the link of the other end of the side or rim chain and then engaged with a sliding keeper link transversely embracing the link next adjacent that carrying the cam lever.

The invention is embodied in the example herein shown and described the features of novelty being finally claimed.

Figure 1:
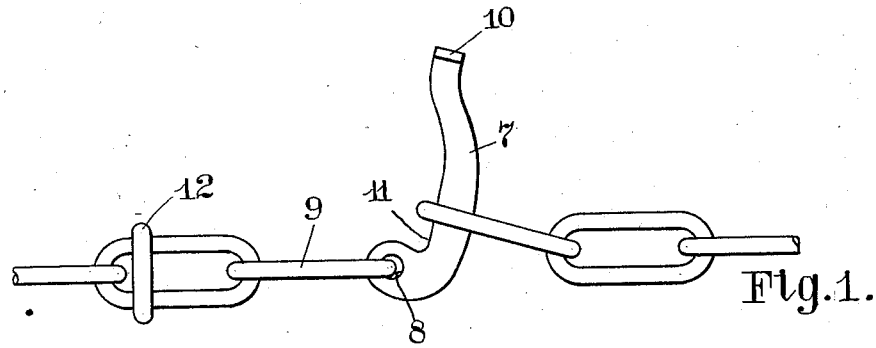
Fig. 1 illustrates in side view the two ends of a side chain one of which is equipped with the fastener lever placed in the end link of the other end according to the invention.
Figure 2:
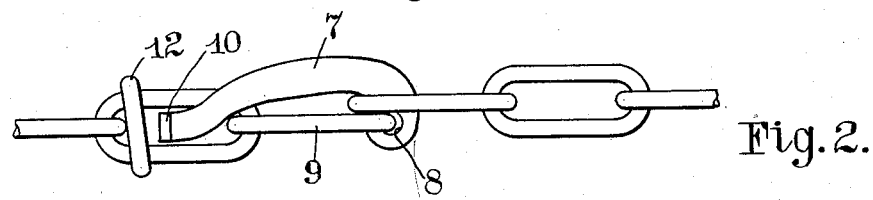
Fig. 2 shows the fastener lever drawn down into position preparatory to having the keeper applied.
Figure 3:
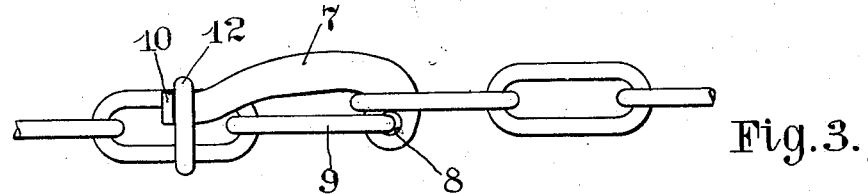
Fig. 3 shows the keeper applied.
Figure 4:
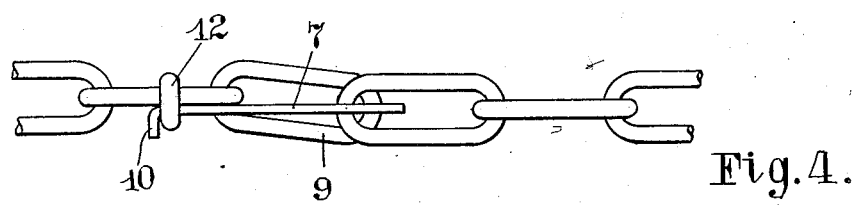
Fig. 4 is a top plan view of Fig. 3 showing the keeper applied.
Figure 5:
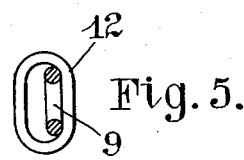
Fig. 5 is a cross section of the link of the chain carrying the keeper with the keeper in full lines.

In the views 7 designates the fastener lever, it having an eye 8 by which the lever is loosely connected to the end link of one end of the rim or side chain 9. Said lever has a laterally upset end to form a projection 10 to be engaged by a keeper, and a cam edge 11 to draw the end link of the other end link of the other end of the chain.

12 designates said keeper, it consisting, in the instance shown, of a shorter link standing loosely and crosswise on the link next the end link of the chain containing the cam fastener lever 7.

The keeper link is of a transverse internal diameter to permit it to be slid past the upset end of the cam lever 7, so that when the chain is straightened, as in use, the lever is retained in the fastening position.

Figure 6:
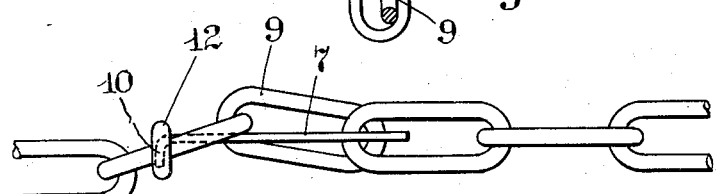
Fig. 6 illustrates how the chain is flexed and the keeper twisted to effect the connection or disconnection of the ends of the side chain.

In practice the keeper link 12 is first passed over the lever onto its link of the chain and then the cam lever after insertion in the end link of the other end of the side chain is drawn toward the end containing the keeper thereby applying cam action and drawing up slack in the chain. Then by flexing the chain and twisting the keeper link slightly as shown in Fig. 6 the keeper link is easily slipped over the end of the cam lever. The cam lever cannot be released from the keeper except by intentionally substantially reversing the operation for securing it. The chance of the accidental release of fastener is extremely remote. It will be noted that the operation of either securing or releasing the chain end is quite simple and can be quickly performed.

The forms of the parts can be changed without departing from the gist of the invention as claimed.

What I claim is:

1. A tire chain fastener for the ends of a chain whose links are universally movable on one another, said fastener including a lever pivoted to a link at one end of the side chain and adapted to lie and swing in a plane parallel to the next connected link, said lever having a lateral projection at its free end, and a keeper consisting of a link transversely embracing the said next link of said end of the chain and adapted to be moved over the free end of lever and its said projection.

2. A tire chain fastener for the ends of a chain whose links are universally movable on one another, said fastener including a cam lever pivoted to a link at one end of the side chain and adapted to lie and swing in a plane parallel to the next connected link, said lever having a lateral projection at its free end, and a keeper consisting of a link transversely embracing the said next link of said end of the chain and adapted to be moved over the free end of the lever and its said projection.

3. A tire chain fastener for the ends of a chain whose links are universally movable on one another, said fastener including a lever pivoted to a link at one end of the side chain and adapted to lie and swing in a plane parallel to the next connected link, said lever having a lateral projection at its free end, and a keeper consisting of a link transversely embracing the said next link of said end of the chain and adapted to be moved over the free end of the lever and its said projection.

FRANK E. STAHL.